US012347408B2

(12) United States Patent
Thür et al.

(10) Patent No.: US 12,347,408 B2
(45) Date of Patent: Jul. 1, 2025

(54) METHOD FOR IDENTIFYING A SONG

(71) Applicant: Yousician Oy, Helsinki (FI)

(72) Inventors: Christoph Thür, Helsinki (FI); Anssi Klapuri, Helsinki (FI); Veli-Jussi Kesti, Helsinki (FI)

(73) Assignee: YOUSICIAN OY, Helsinki (FI)

( * ) Notice: Subject to any disclaimer, the term of this patent is extended or adjusted under 35 U.S.C. 154(b) by 266 days.

(21) Appl. No.: 18/309,599

(22) Filed: Apr. 28, 2023

(65) Prior Publication Data

US 2023/0351988 A1 Nov. 2, 2023

(30) Foreign Application Priority Data

Apr. 28, 2022 (FI) ..................................... 20227059

(51) Int. Cl.
*G10H 1/00* (2006.01)
*G10G 1/00* (2006.01)

(52) U.S. Cl.
CPC ............ *G10H 1/0008* (2013.01); *G10G 1/00* (2013.01); *G10H 2210/061* (2013.01); *G10H 2210/066* (2013.01); *G10H 2210/076* (2013.01); *G10H 2210/081* (2013.01)

(58) Field of Classification Search
CPC .. G10H 1/0008; G10H 1/00; G10H 2210/061; G10H 2210/066; G10H 2210/076; G10H 2210/081
See application file for complete search history.

(56) References Cited

U.S. PATENT DOCUMENTS

2006/0288845 A1* 12/2006 Gale .................... G11B 27/322
2017/0097992 A1 4/2017 Vouin et al.
2021/0035541 A1 2/2021 Pande et al.
2023/0351988 A1* 11/2023 Thür .................... G10H 1/0008

FOREIGN PATENT DOCUMENTS

CN 111081272 A * 4/2020 ........... G10H 1/0008
EP 3570271 A1 11/2019
WO 2018112260 A1 6/2018

OTHER PUBLICATIONS

Extended European Search Report issued in European Patent Application No. 23170706.8 dated Sep. 15, 2023.

* cited by examiner

*Primary Examiner* — Robert W Horn
(74) *Attorney, Agent, or Firm* — NIXON & VANDERHYE

(57) ABSTRACT

A computer-implemented method for identifying a song includes: providing audio data including musical notation information for songs, receiving a real-time audio signal of a user performing on an instrument, detecting playing activity in successive segments, detecting notes and/or chords from the audio signal, storing user play history information including of information of songs a user has played before and number of plays, based on the play history information calculating a first probability for a song, based on first probabilities for a number of songs and based on the detected playing activity and the detected notes and/or chords, estimating the song being performed. The estimation includes calculating a second probability for different songs. The second probabilities are defined by the audio signal corresponding with a particular song of the play history combined with first probability associated with the song, and providing the song the user is performing or related information.

17 Claims, 6 Drawing Sheets

METHOD FOR IDENTIFYING A SONG

CROSS-REFERENCE TO RELATED APPLICATIONS

This application claims priority to FI Patent application No. 20227059 filed Apr. 28, 2022, the entire contents of which are hereby incorporated by reference.

BACKGROUND OF THE INVENTION

Field of the Invention

The present disclosure generally relates to computer-implemented methods and systems. More specifically the present disclosure relates to a computer-implemented method for identifying a song user wants to perform and a system thereof.

Description of the Related Art

This section illustrates useful background information without admission of any technique described herein representative of the state of the art.

In a conventional solution, the user selects a song and then operates the user interface to so that the solution, such as a mobile application, provides the user with the musical notation of the song or start playing the song or backing track of the song. The user can then play along with the backing track.

Playing a song is however often a personal, emotional and expressive experience. Ideally, the player knows the song by heart and is able to just play from the heart and sing. The next best thing is playing with the aid of lyrics and chord charts or tablature. Things that distract from this experience are e.g. scrolling through lyrics while playing causing the user to remove their hand from the instrument, or browsing through lists of songs necessitating the user to switch switching from play mindset to analyze mindset.

However, automatic detection of the song from a freely performed user performance, such as a user playing an instrument at their own tempo and choice of harmonies without adhering to the details of a predefined arrangement/notation of the song is difficult. When playing freely, the performer is usually reading chord-based music notation that describes the harmonic progression of the song with chord names, chord symbols, or chord diagrams without detailing the note-by-note arrangement of the song or the rhythmic patterns. Playing freely is very common when playing the part of an accompanying instrument in a song. The challenge in detecting a specific song from such free playing is that the amount of information contained in a few chords is typically not sufficient to disambiguate the song from among a large collection of songs.

SUMMARY OF THE INVENTION

The appended claims define the scope of protection. Any examples and technical descriptions of apparatuses, products and/or methods in the description and/or drawings not covered by the claims are presented not as embodiments of the invention but as background art or examples useful for understanding the invention.

One goal of the invention is that a user utilizing the system and method according to the present disclosure does not need to click through an application user interface or menus in order to choose a song or songs that the user wants to perform. Instead, the user can simply start playing, and the system and method recognize the song from the user play history and current user play performance, which may be used to display written music and/or lyrics for the user automatically. Further, the system and method may provide backing track audio pertaining to the recognized song at the tempo of the user, and at the position where the user is in the song.

According to a first example aspect there is provided computer-implemented method for identifying a song comprising:

- providing musical notation information harmonic progression information for songs,
- receiving a real-time audio signal of a user performing on an instrument,
- detecting playing activity in successive segments of the user in successive segments from the real-time audio signal,
- detecting notes and/or chords from the real-time audio signal,
- storing user play history information comprising of information of songs a user has played before, and how often the user has previously played said songs, optionally additionally in relation to the timing when the user has played said songs,
- based on the play history information calculating a first probability for at least one song,
- based on a number of first probabilities for a number of songs and based on the detected playing activity and the detected notes and/or chords, estimating the song that the user is performing, wherein
  - said estimation comprises calculating a second probability for a number of different songs wherein the second probabilities are defined by the real-time audio signal corresponding with a particular song of the play history combined with first probability associated with said song, and
- providing the song the user is performing or information pertaining to the song.

According to a second example aspect there is provided a system or apparatus comprising:

- a storage for maintaining a music document defining how different parts should be played in a piece of music;
- a display configured to display a part of the music document or information pertaining to a song or version of a song when a user plays the piece of music;
- an input for receiving a real-time audio signal of music playing by the user;
- at least one processor configured to perform at least:
  - providing a set of audio data comprising musical notation information for songs,
  - receiving a real-time audio signal of a user performing on an instrument,
  - detecting playing activity in successive segments of the user in successive segments from the real-time audio signal,
  - detecting notes and/or chords from the real-time audio signal,
  - storing user play history information comprising of information of songs a user has played before, and how often the user has previously played said songs, optionally additionally in relation to the timing when the user has played said songs,
  - based on the play history information calculating a first probability for at least one song,
  - based on a number of first probabilities for a number of songs and based on the detected playing activity and the detected notes and/or chords, estimating the song that the user is performing, wherein said estimation comprises calculating a second probability for a number of different songs wherein the second probabilities are defined by the real-time audio signal corresponding with a particular song of the play history combined with first probability associated with said song, and providing the song the user is performing or information pertaining to the song.

The apparatus may be or comprise a mobile phone.

The apparatus may be or comprise a smart watch.

The apparatus may be or comprise a tablet computer.

The apparatus may be or comprise a laptop computer.

The apparatus may be or comprise a smart watch.

The apparatus may be or comprise a tablet computer.

The apparatus may be or comprise a laptop computer.

The apparatus may comprise a smart instrument amplifier, such as a smart guitar amplifier.

The apparatus may comprise a smart speaker, such as a virtual assistant provided speaker.

The apparatus may be or comprise a desktop computer.

The apparatus may be or comprise a computer.

According to a third example aspect there is provided a computer program comprising computer executable program code which when executed by at least one processor causes an apparatus at least to perform the method of the first example aspect.

According to a fourth example aspect there is provided a computer program product comprising a non-transitory computer readable medium having the computer program of the third example aspect stored thereon.

According to a fifth example aspect there is provided an apparatus comprising means for performing the method of the first example aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

The expression "a number of" refers herein to any positive integer starting from one (1), e.g. to one, two, or three.

The expression "a plurality of" refers herein to any positive integer starting from two (2), e.g. to two, three, or four.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE DRAWINGS

Some example embodiments will be described with reference to the accompanying figures, in which.

DETAILED DESCRIPTION

In the following description, like reference signs denote like elements or steps.

Figure 1:
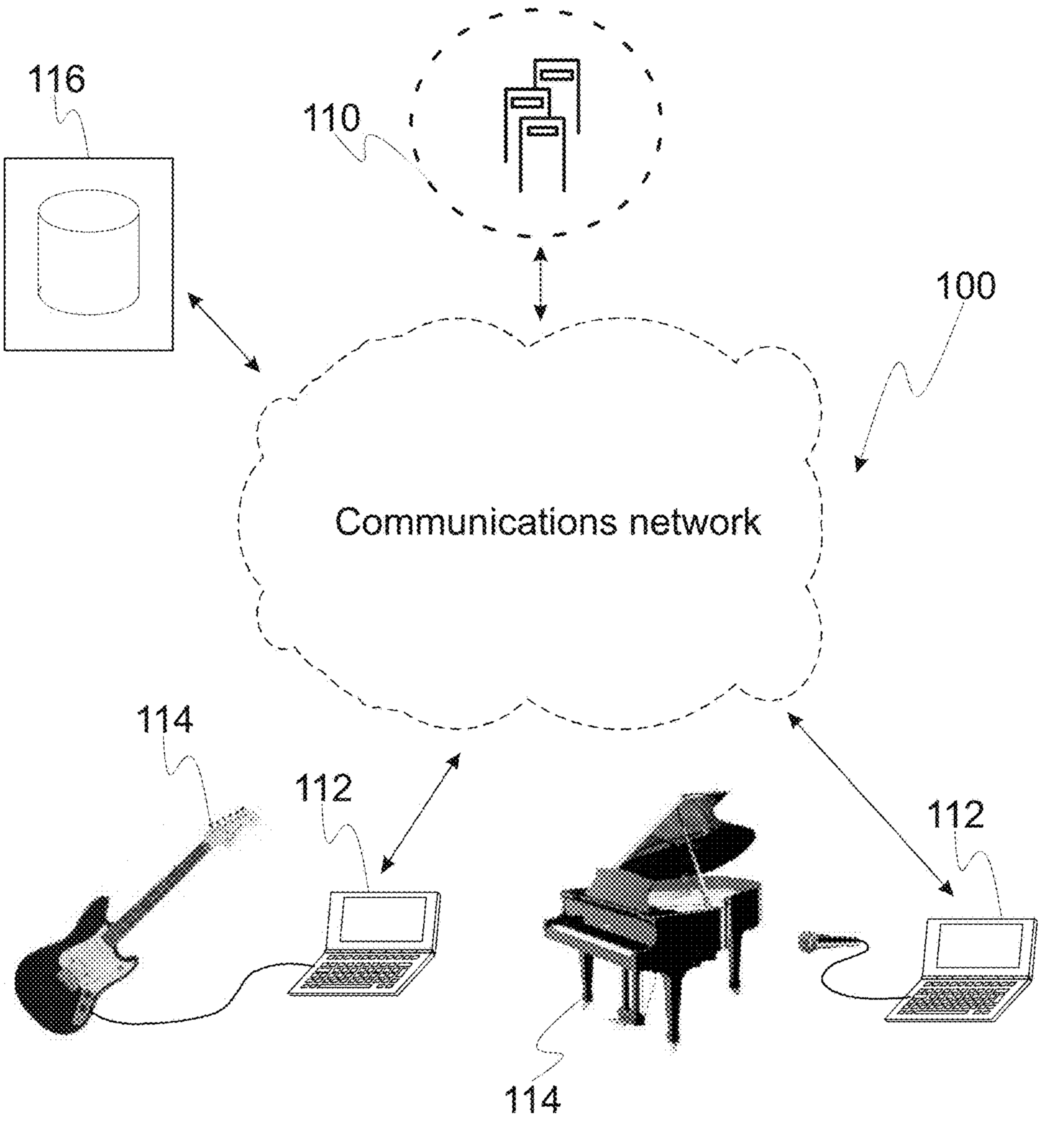
FIG. 1 schematically shows a system according to an example embodiment.

FIG. 1 schematically shows a system 100 according to an example embodiment. The system comprises a musical instrument 114 and an apparatus 112, such as a mobile phone, a tablet computer, smart instrument amplifier, smart speaker, or a laptop computer. The setting may be for example a user playing an instrument 114 and using a user apparatus 112 at their home.

Figure 2:
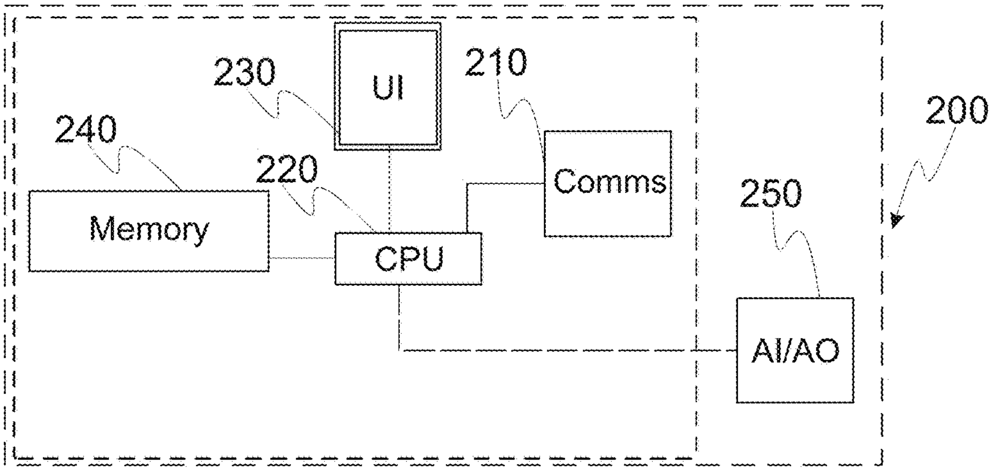
FIG. 2 shows a block diagram of an apparatus according to an example embodiment.

FIG. 2 shows a block diagram of an apparatus 200 according to an example embodiment. The apparatus 200 comprises a communication interface 210; a processor 220; a user interface 230; and a memory 240.

The communication interface 210 comprises in an embodiment a wired and/or wireless communication circuitry, such as Ethernet; Wireless LAN; Bluetooth; GSM; CDMA; WCDMA; LTE; and/or 5G circuitry. The communication interface can be integrated in the apparatus 200 or provided as a part of an adapter, card, or the like, that is attachable to the apparatus 200. The communication interface 210 may support one or more different communication technologies. The apparatus 200 may also or alternatively comprise more than one of the communication interfaces 210.

In this document, a processor may refer to a central processing unit (CPU); a microprocessor; a digital signal processor (DSP); a graphics processing unit; an application specific integrated circuit (ASIC); a field programmable gate array; a microcontroller; or a combination of such elements.

The user interface 230 may comprise a circuitry for receiving input from a user of the apparatus 200, e.g., via a keyboard; graphical user interface shown on the display of the apparatus 200; speech recognition circuitry; or an accessory device; such as a microphone, headset, or a line-in audio 250 connection for receiving the performance audio signal; and for providing output to the user via, e.g., a graphical user interface or a loudspeaker.

The memory 240 comprises a work memory and a persistent memory configured to store computer program code and data. The memory 240 may comprise any one or more of: a read-only memory (ROM); a programmable read-only memory (PROM); an erasable programmable read-only memory (EPROM); a random-access memory (RAM); a flash memory; a data disk; an optical storage; a magnetic storage; a smart card; a solid-state drive (SSD); or the like. The apparatus 200 may comprise a plurality of the memories 240. The memory 240 may be constructed as a part of the apparatus 200 or as an attachment to be inserted into a slot; port; or the like of the apparatus 200 by a user or by another person or by a robot. The memory 240 may serve the sole purpose of storing data or be constructed as a part of an apparatus 200 serving other purposes, such as processing data.

A skilled person appreciates that in addition to the elements shown in FIG. 2, the apparatus 200 may comprise other elements, such as microphones; displays; as well as additional circuitry such as input/output (I/O) circuitry; memory chips; application-specific integrated circuits (ASIC); processing circuitry for specific purposes such as source coding/decoding circuitry; channel coding/decoding circuitry; ciphering/deciphering circuitry; and the like. Additionally, the apparatus 200 may comprise a disposable or rechargeable battery (not shown) for powering the apparatus 200 if external power supply is not available.

Figure 3:
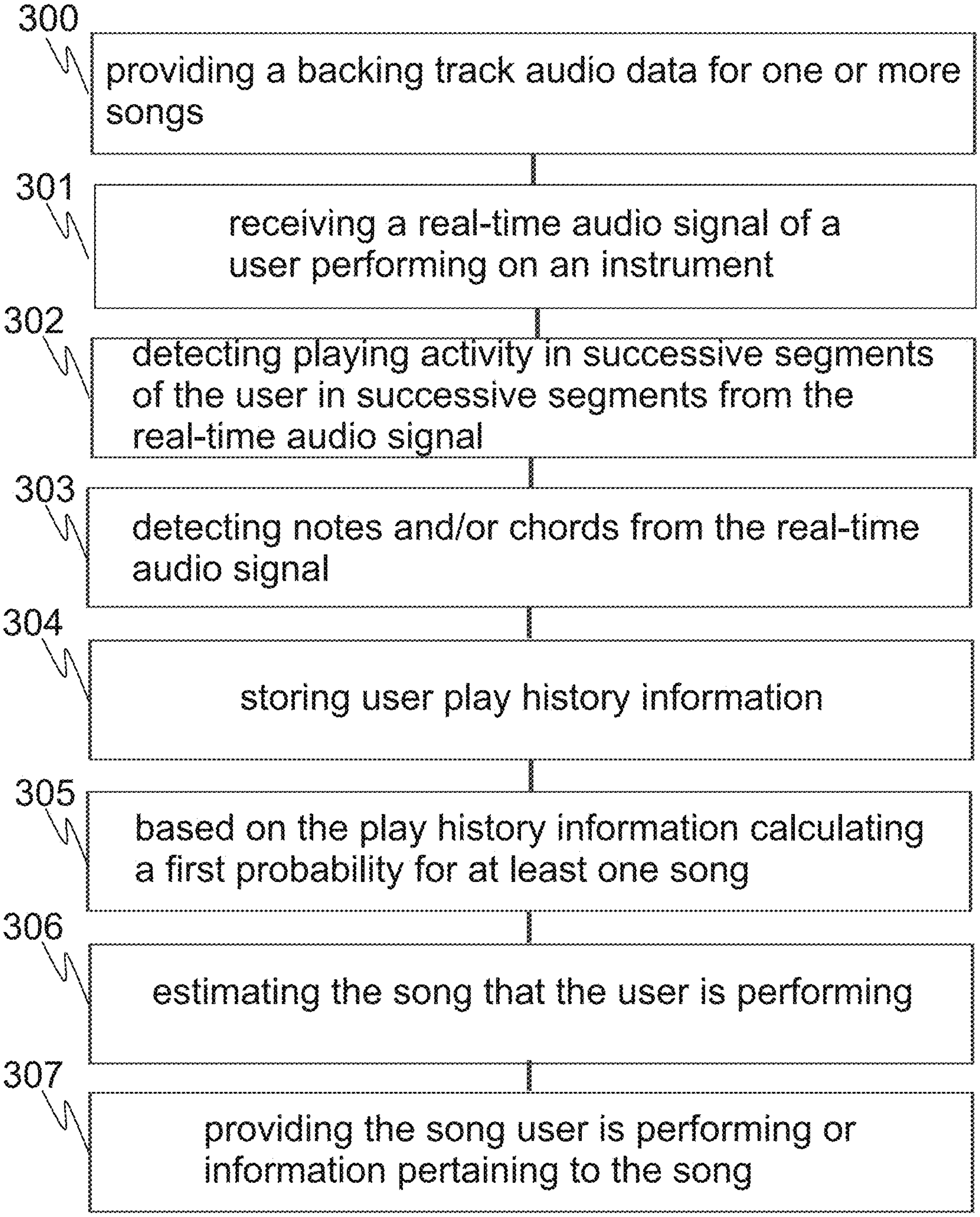
FIG. 3 shows a flow chart according to an example embodiment.
Figure 3:
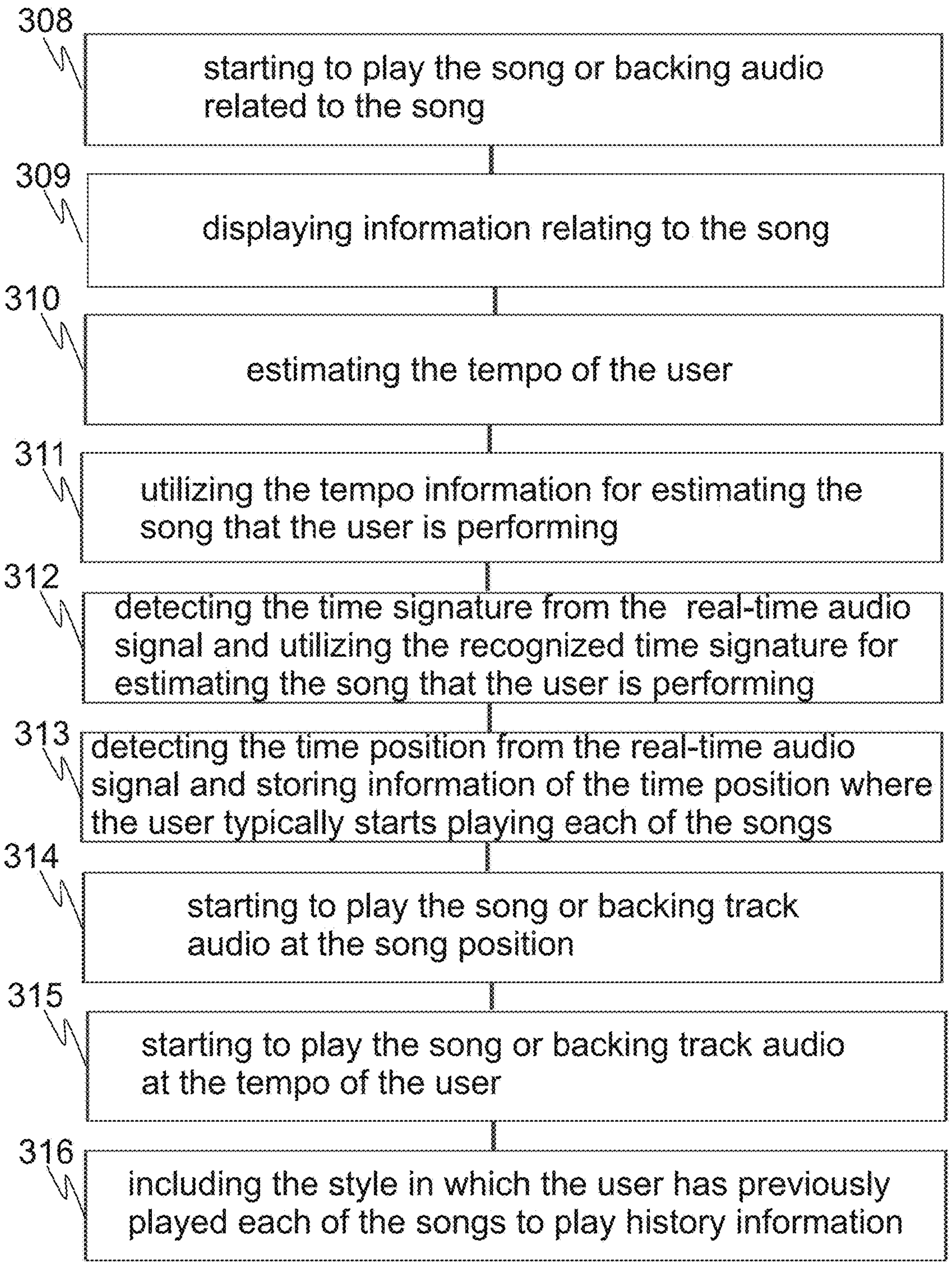
Figure 3:
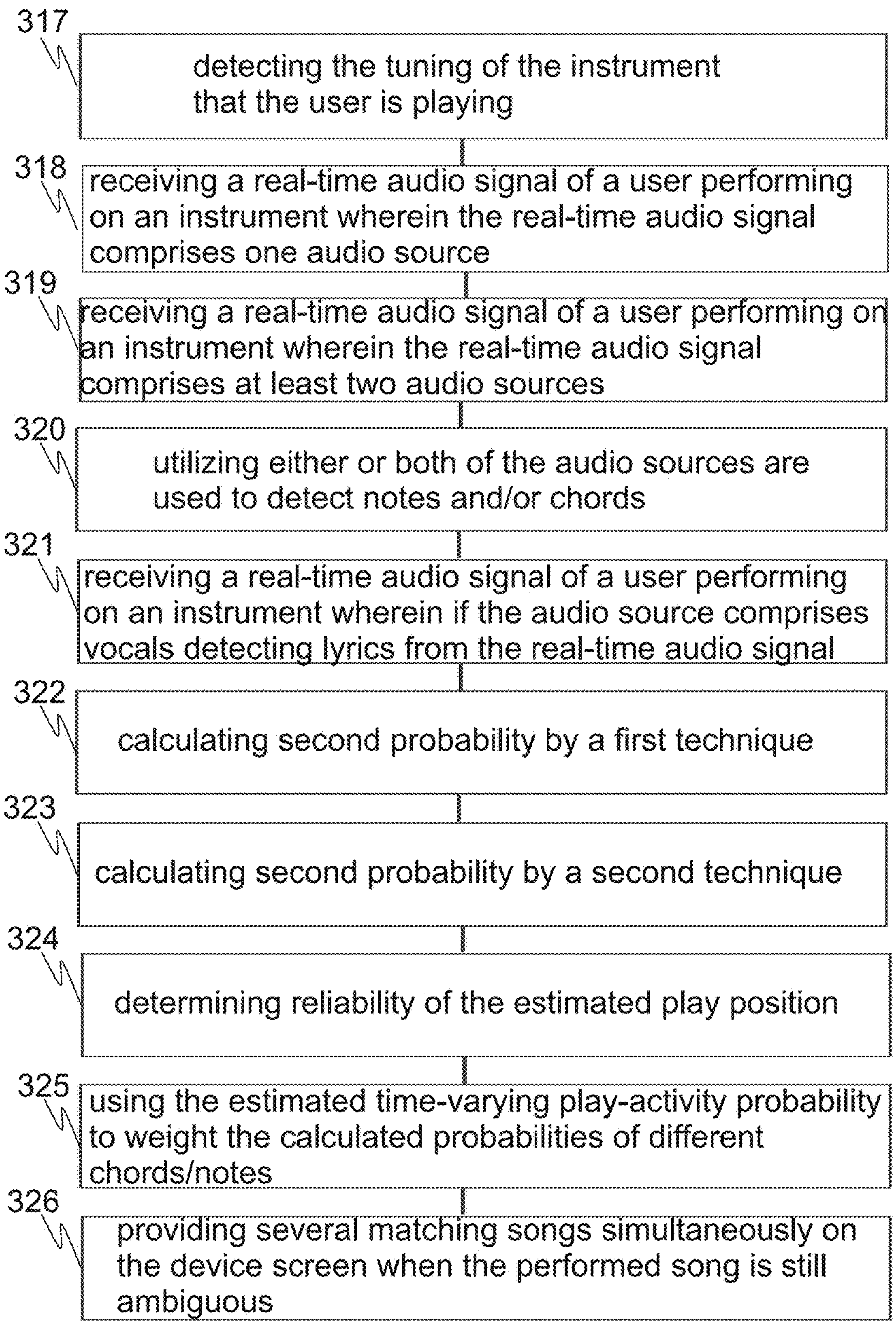
Figure 3:
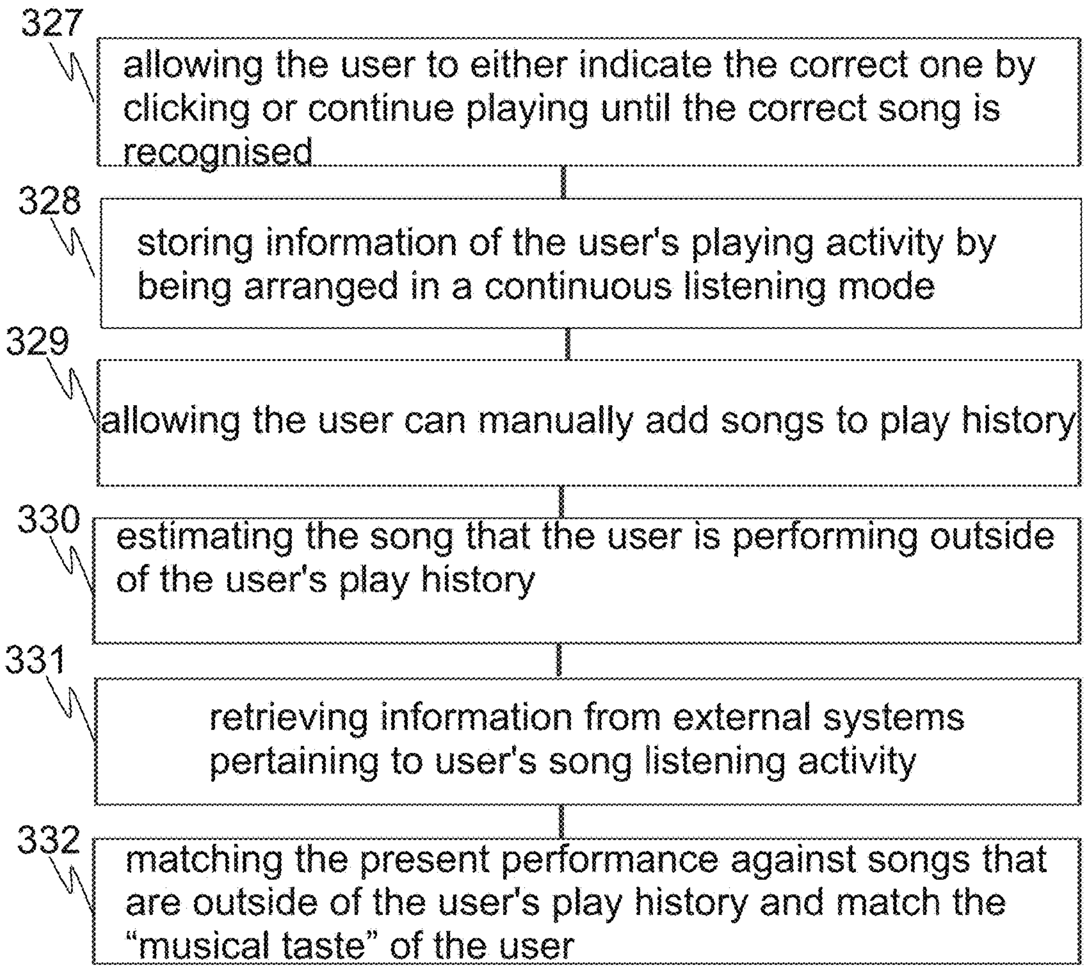

FIG. 3 shows a flow chart according to an example embodiment. FIG. 3 illustrates a process comprising various possible steps including some optional steps while also further steps can be included and/or some of the steps can be performed more than once:

300. providing a set of musical notation information or harmonic progression information for songs,

301. receiving a real-time audio signal of a user performing on an instrument,

302. detecting playing activity in successive segments of the user in successive segments from the real-time audio signal,

303. detecting notes and/or chords from the real-time audio signal,

304. storing user play history information comprising of information of songs a user has played before, and how often and when the user has previously played said songs, optionally additionally in relation to the timing when the user has played said songs,

305. based on the play history information calculating a first probability for at least one song,

306. based on a number of first probabilities for a number of songs and based on the detected playing activity and the detected notes and/or chords, estimating the song that the user is performing, wherein said estimation comprises calculating a second probability for a number of different songs wherein the second probabilities are defined by the real-time audio signal corresponding with a particular song of the play history combined with first probability associated with said song, and

307. providing the song user is performing or information pertaining to the song.

The method may further comprise any one or more of:

308. starting to play the song or backing audio related to the song;

309. displaying information relating to the song, such as musical notation of the song;

310. estimating the tempo of the user and including information of the tempos at which a user has performed different songs to the play history information;

311. utilizing the tempo information for estimating the song that the user is performing.

312. detecting the time signature from the real-time audio signal and utilizing the recognized time signature for estimating the song that the user is performing.

313. detecting the time position from the real-time audio signal and storing information of the time position where the user typically starts playing each of the songs to the play history information and using said time position for estimating the song that the user is performing;

314. starting to play the song or backing track audio at the song position;

315. starting to play the song or backing track audio at the tempo of the user;

316. including the style in which the user has previously played each of the songs to play history information and including said style for estimating the song that the user is performing, wherein the style comprises information of the applied rhythmic patterns and arrangement of individual note pitches;

317. detecting the tuning of the instrument that the user is playing on from the real-time audio signal and including the tuning applied in each of the songs play history and using said tuning information for estimating the song that the user is performing;

318. receiving a real-time audio signal of a user performing on an instrument wherein the real-time audio signal comprises one audio source;

319. receiving a real-time audio signal of a user performing on an instrument wherein the real-time audio signal comprises at least two audio sources;

320. utilizing either or both of the audio sources are used to detect notes and/or chords;

321. receiving a real-time audio signal of a user performing on an instrument wherein if the audio source comprises vocals detecting lyrics from the real-time audio signal and using said lyrics information for estimating the song that the user is performing;

322. calculating second probability by:

a. tracking the tempo and beat of the user performance and subdividing the real-time audio signal into successive segments by using each beat position as a segment boundary, wherein optionally, additional segment boundaries can be placed halfway between each two beat positions, to double the time resolution;

b. if the user is assumed to be performing according to a detailed (note-by-note) musical notation, the calculating an array of probabilities for all different musical notes, such as based on 88 note piano keyboard system, in each segment; and c. if the user is performing freely (based on reading or remembering a chord-based music document), the calculating an array of probabilities for different chords that may appear in the catalogue of songs maintained by the system; wherein d. in both cases forming a matrix of probabilities where one dimension is time (in musical beat units) and the other dimension is note/chord;

e. matching the matrix of probabilities at different temporal positions of the music documents that represent different songs in the play history, wherein said matching may comprise determination of a degree of match by calculating correlation coefficient between the matrix of note/chord probabilities estimated from the audio signal with the binary-valued matrix of note/chord presence matrix extracted from the music document.

323. calculating second probability by:

a. The method of any preceding claim, wherein the second probability is calculated by:

b. estimating time-varying probabilities of playing activity from the real-time audio signal, such as by tracking the probability that the user is playing any sounding notes in successive segments of the audio signal;

c. tracking the time-varying tempo of the user, wherein several tempo candidates/hypotheses are tracked side-by-side, with probabilities associated with each tempo candidate;

d. estimating probabilities of different notes/chords to be sounding in the real-time audio signal:

i. if the user is assumed to be performing from a detailed (note-by-note) musical notation, the estimating the time-varying probabilities of all allowable musical notes, such as based on 88 note piano keyboard system;

ii. if the user is assumed to be performing freely, the calculating an array of probabilities for different chords that may appear in the catalogue of songs maintained by the system;

e. using the time-varying measurements including estimated activity probability, tempo, and note/chord probabilities to track the play position of the user in several different songs simultaneously;

f. calculating a value for second probability for a song from the reliability of the estimated play position in song;

324. determining reliability of the estimated play position based on one or more of the following:

a. given the trajectory of user play positions as a function of time for a certain song S, comparing to the notes/chords that appear in a music document pertaining to a song at the positions indicated by the trajectory of play positions after which comparing the estimated probabilities for those notes/chords at the corresponding times in the audio signal, and calculates the total probability of having observed those notes/chords over time;

b. monitoring the stability of the estimated play position—whether there are sudden jumps in the estimated position, and the stability of the speed-of-advancement of the estimated play position, wherein higher stability indicates higher reliability; and c. calculating the ratio X/Y of performed chord duration X to written chord duration Y, wherein performed chord duration is calculated by counting the amount of musical beats from one chord change to the next chord change, and wherein written chord duration refers to the amount of musical beats between those two chord changes in the music document;

325. using the estimated time-varying play-activity probability to weight the calculated probabilities of different chords/notes in such a way that more importance is given to time points where the performer actually plays something;

326. providing several matching songs simultaneously on the device screen when the performed song is still ambiguous;

327. allowing the user to either indicate the correct one by clicking or continue playing until the correct song is recognised;

328. storing information of the user's playing activity by being arranged in a continuous listening mode, where the user performance can be recorded to track how many times and when the user played those songs;

329. allowing the user to manually add songs to play history, without actually playing them;

330. estimating the song that the user is performing outside of the user's play history;

331. retrieving information from external systems pertaining to user's song listening activity;

332. matching the present performance against songs that are outside of the user's play history and match the "musical taste" of the user.

Figure 4:
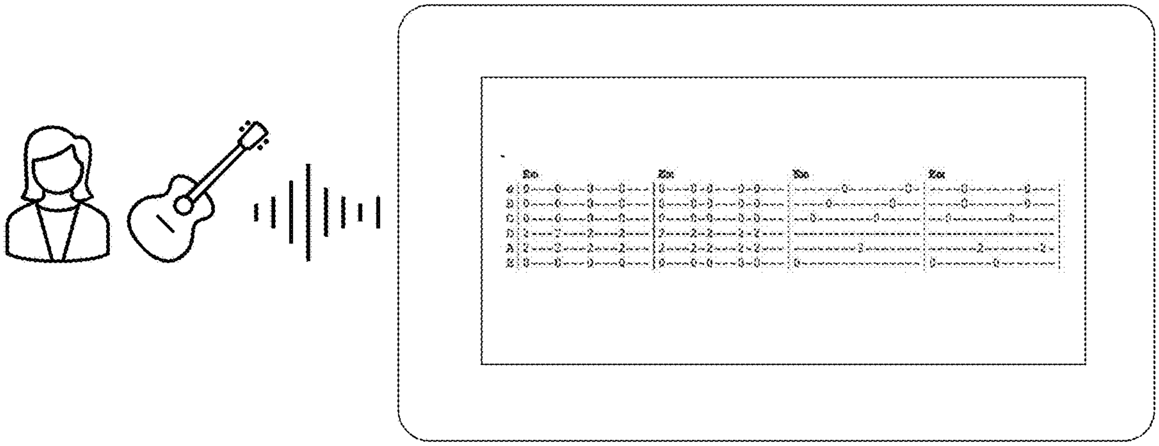
FIG. 4 shows an overview of an example embodiment.

FIG. 4 illustrates a general view of an example of an embodiment. The user is shown to play an instrument, namely a guitar in this case, using a mobile apparatus with microphone or line-in to track user's performance, i.e. playing of the instrument, and to detect which notes and chords the user plays. The user may start to perform freely with their instrument and the system and method thereof recognize the song after which the user may be provided with written music and lyrics pertaining to the song via the display of the mobile apparatus. Further, the system and method may after recognition of the song start playing a backing track pertaining to the recognized song via the mobile apparatus, optionally at the place and tempo at which the user is performing the song.

The user performance may comprise, for example, playing of a plurality of opening chords of a song or some other position or part of a song. Additionally, user play history is combined with the detected user performance so that a song corresponding to the user performance may be more effectively detected from a large set of songs. The mobile apparatus is provided with user play history, song information and backing track audio data from an external server or cloud arrangement. As mentioned, such song information may comprise notation of the song but also further information such as practice information or alternative versions of the song and/or various types of visualization of the song or user performance thereof. Alternatively, the mobile apparatus may store at least part of the user play history, song information and backing track data. This way the user may utilize the system and method by very little user intervention or operation of the user interface and focus on free expression on their instrument, which is automatically detected and matched with a song to which song information may then be provided automatically for example to accompany the user's playing or help them play or practice the song.

Many tempo estimation techniques are known and may be used since it is a widely discussed topic in prior art. Examples of estimating user activity, playing position and tempo are discussed hereinbelow, which are all obtained by analyzing the performance audio signal in real time:

Activity features indicate when the user is actually playing as opposed to momentarily not producing any sounding notes from the instrument. The latter can be due to any reason, such as a rest (silent point) in the rhythmic pattern applied, or due to the performer pausing her performance. Accordingly, activity features play two roles in our system: 1) They allow weighting the calculated likelihoods of different chords in such a way that more importance is given to time points in the performance where the performer actually plays something (that is, where performance information is present). 2) Activity features allow the method to keep the estimated position fixed when the performer pauses and continue moving the position forward when performance resumes. For amateur performers, it is not uncommon to hesitate and even stop for a moment to figure out a hand position on the instrument, for example. Also, when performing at home, it is not uncommon to pause performing for a while to discuss with another person, for example. More technically, activity features describe in an embodiment the probability of any notes sounding in a given audio segment: p(NotesSounding|AudioSegment(t)) as a real number between 0 and 1.

Tonal features monitor the pitch content of the user's performance. As described above, when performing from a lead sheet, we do not know in advance the exact notes that the user will play nor their timing: the arrangement/texture of the music is unknown in advance. For that reason, we instead employ an array of models that represent different chords that may appear in the lead sheets. The models allow calculating a "match" or "score" for those chords: the likelihood that the corresponding chord is sounding in a given segment of the performance audio. Note that the system can be even totally agnostic about the component notes of each chord—for example when the model for each chord is trained from audio data, giving it examples where the chord is/is not sounding. Tonality feature vector is obtained by calculating a match between a given segment of performance audio and all the unique chords that occur in the song. More technically: probabilities of different chords sounding in a given an audio segment t: p(Chord(i)|AudioSegment(t)), where the chord index i=1, 2, . . . , <number of unique chords in the song>. Tonality features help us to estimate the probability for the performer to be at different parts of the song. Amateur performers sometimes jump backward in the performance to repeat a short segment or to fix a performance mistake. Also jumps forward are possible. Harmonic content of the user's playing allows the method to "anchor" the users position in the song even in the presence of such jumps.

Tempo features is used to estimate the tempo (or, playing speed) of the performer in real time. In many songs, there are segments where the chord does not change for a long time. Within such segments, the estimated tempo of the user drives the performer's position forward. In other words, even in the absence of chord changes (harmonic changes), having an estimate of the tempo of the user allows us to keep updating the performer's position. More technically: probabilities of different tempos (playing speeds) given the performance audio segment t, p(Tempo(j)|AudioSegment0, 1, 2, . . . , t)), where index j covers all tempo values between a minimum and maximum tempo of interest.

By combining information from the above-mentioned three features, and backing track information, we can tackle the various challenges in tracking the position x(t) and playing tempo of an amateur performer and set a backing track corresponding to the position and playing tempo wherein:

1. Activity features help to detect the moments where performance information is present, in other words, where the performer is actually producing some sounding notes. They also capture the situation when the user pauses playing.
2. Tonality features indicate the possible positions (at a larger time scale) where the user could be in the song. This feature helps to deal with cases where the user jumps forward or backward in the song.
3. Tempo features drive forward user position locally, within segments where the tonality remains the same for some time. User position x(t) at time t can be extrapolated from the previous position x(t−1) and the playing speed v(t). However sometimes the user may jump backward or forward within the song. In that case, tonality features help to detect the jump and "reset" this locally linear extrapolation of the performer's position.

Any of the above-described methods, method steps, or combinations thereof, may be controlled or performed using hardware; software; firmware; or any combination thereof. The software and/or hardware may be local; distributed; centralized; virtualized; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer-implemented method for identifying a song comprising:

providing a set of musical notation information or harmonic progression information for songs, receiving a real-time audio signal of a user performing on an instrument, detecting playing activity in successive segments of the user in successive segments from the real-time audio signal, detecting notes and/or chords from the real-time audio signal, storing user play history information comprising of information of songs a user has played before, and how often the user has previously played said songs, based on the play history information calculating a first probability for at least one song, based on a number of first probabilities for a number of songs and based on the detected playing activity and the detected notes and/or chords, estimating the song that the user is performing, wherein said estimation comprises calculating a second probability for a number of different songs wherein the second probabilities are defined by the real-time audio signal corresponding with a particular song of the play history combined with first probability associated with said song, and providing the song the user is performing or information pertaining to the song.

2. The method of claim 1, wherein providing a set of audio data and starting to play the song or backing audio related to the song.

3. The method of claim 1, wherein displaying information relating to the song.

4. The method of claim 1, wherein additionally estimating the tempo of the user and including information of the tempos at which a user has performed different songs to the play history information.

5. The method of claim 4, wherein utilizing the tempo information for estimating the song that the user is performing.

6. The method of claim 1, wherein additionally detecting the time signature from the real-time audio signal and utilizing the recognized time signature for estimating the song that the user is performing.

7. The method of claim 1, wherein additionally detecting the time position from the real-time audio signal and storing information of the time position where the user typically starts playing each of the songs to the play history information and using said time position for estimating the song that the user is performing.

8. The method of claim 7, wherein starting to play the song or backing track audio at the song position.

9. The method of claim 8, wherein starting to play the song or backing track audio at the tempo of the user.

10. The method of claim 1, wherein additionally including the style in which the user has previously played each of the songs to play history information and including said style for estimating the song that the user is performing, wherein the style comprises information of the applied rhythmic patterns and arrangement of individual note pitches.

11. The method of claim 1, wherein detecting the tuning of the instrument that the user is playing on from the real-time audio signal and including the tuning applied in each of the songs play history and using said tuning information for estimating the song that the user is performing.

12. The method of claim 1, wherein real-time audio signal comprises one audio source.

13. The method of claim 1, wherein real-time audio signal comprises at least two audio sources.

14. The method of any claim 13, wherein either or both of the audio sources are used to detect notes and/or chords.

15. The method of claim 1, wherein if the audio source comprises vocals detecting lyrics from the real-time audio signal and using said lyrics information for estimating the song that the user is performing.

16. A system comprising a processing entity arranged to at least store, provide and process information to execute the method of claim 1.

17. A non-transitory computer readable medium, comprising computer executable program code which when executed by at least one processor causes an apparatus at least to perform the method of claim 1.

* * * * *